(12) United States Patent
Kim et al.

(10) Patent No.: US 9,335,020 B2
(45) Date of Patent: May 10, 2016

(54) LAMP FOR VEHICLE

(71) Applicant: SL Corporation, Daegu (KR)

(72) Inventors: Yong Hwan Kim, Gyeongbuk (KR); Do Yoon Song, Gyeongbuk (KR)

(73) Assignee: SL Corporation, Daegu (KR)

( * ) Notice: Subject to any disclaimer, the term of this patent is extended or adjusted under 35 U.S.C. 154(b) by 0 days.

(21) Appl. No.: 14/645,214

(22) Filed: Mar. 11, 2015

(65) Prior Publication Data

US 2015/0258932 A1     Sep. 17, 2015

(30) Foreign Application Priority Data

Mar. 14, 2014   (KR) .................. 10-2014-0030068

(51) Int. Cl.
*F21S 8/10*   (2006.01)
*B60Q 1/26*   (2006.01)

(52) U.S. Cl.
CPC ......... *F21S 48/2212* (2013.01); *F21S 48/2237* (2013.01); *F21S 48/2268* (2013.01); *F21S 48/2281* (2013.01); *F21S 48/234* (2013.01); *F21S 48/24* (2013.01); *B60Q 1/2665* (2013.01)

(58) Field of Classification Search
CPC .......... B60Q 1/34; B60Q 1/2661; B60Q 1/26; B60Q 1/2665; B60Q 2400/50; F21S 48/2212; F21S 48/234; F21S 48/24; F21S 48/2237; F21S 48/2281; F21S 48/2268
See application file for complete search history.

(56) References Cited

U.S. PATENT DOCUMENTS

| | | | | |
|---|---|---|---|---|
| 6,637,917 B2 * | 10/2003 | Schwanz | ............. | B60Q 1/2665 362/140 |
| 7,347,598 B2 * | 3/2008 | Seguchi | ............... | B60Q 1/2665 362/494 |
| 7,699,511 B2 * | 4/2010 | Kawaji | ................. | B60Q 1/2665 362/459 |
| 2008/0106396 A1 * | 5/2008 | Hsieh | ................... | B60Q 1/2665 340/475 |

FOREIGN PATENT DOCUMENTS

| | | |
|---|---|---|
| CN | 102452356 A | 5/2012 |
| DE | 10 2004 012052 A1 | 10/2005 |
| KR | 10-2009-0071035 A | 7/2009 |
| KR | 10-2013-011779 A | 1/2013 |
| KR | 20130011779 A | 1/2013 |

* cited by examiner

*Primary Examiner* — Bao Q Truong
(74) *Attorney, Agent, or Firm* — Mintz Levin Cohn Ferris Glovsky and Popeo, P.C.; Kongsik Kim; Colleen H. Witherell

(57) ABSTRACT

Provided is a lamp for a vehicle, which can form a predetermined repetition image with the use of a signal lamp installed at an outside mirror of a vehicle. The lamp for a vehicle includes: a mirror housing; and a signal lamp configured to be installed on a surface of the mirror housing, wherein the signal lamp includes a reflection unit, a lens unit disposed at the front of the reflection unit and having a half mirror, and a light source unit disposed between the reflection unit and the lens unit having one or more light sources and a light guide, thereby generating a light pattern having repetition image with an original image of the light guide and one or more reflected images of the original image.

16 Claims, 18 Drawing Sheets

220

LAMP FOR VEHICLE

This application claims priority to Korean Patent Application No. 10-2014-0030068 filed on, Mar. 14, 2014, the disclosure of which is incorporated herein by reference in its entirety.

BACKGROUND

1. Field of the Invention

The invention relates to a lamp for a vehicle, and more particularly, to a lamp for a vehicle, which can form a predetermined repetition image with the use of a signal lamp installed at an outside mirror of a vehicle.

2. Description of the Related Art

Most vehicles are equipped with lamps or lights for illuminating purpose (e.g., headlamps and fog lamps) or signaling purpose (e.g., turn signal lamps, tail lamps, brake lamps, and side marker lamps). Halogen lamps or high-intensity discharge (HID) lamps have been used as light sources. In recent years, light-emitting diodes (LEDs) have been increasingly used as light sources for vehicle lamps or lights for many reasons. For example, as LEDs have a similar color temperature to that of sunlight, i.e., a color temperature of about 5,500 K, they are known to cause less fatigue to the human eyes than other light sources. In addition, as LEDs can be miniaturized, they can improve the degree of freedom of the design of vehicle lamps or lights. Moreover, as LEDs have semi-permanent lifetime, they are highly economical. Consumers consider not only the functional aspects (such as securing a clear view for safety driving) but also the aesthetic aspects of vehicle lamps or lights in deciding which vehicle to buy.

There continues to be a need for further innovation in vehicle lamps that can satisfy functional aspects and aesthetic aspects.

SUMMARY

Exemplary embodiments of the invention provide a lamp for a vehicle, in which a signal lamp capable of displaying a predetermined repetition image is installed at an outside mirror of a vehicle so as to ensure safe driving of the vehicle and/or improve design and/or aesthetic aspects of the vehicle and/or reduce manufacturing cost.

A lamp for a vehicle according to an exemplary embodiment of the invention includes a mirror housing accommodating a mirror therein and a signal lamp installed on a portion of an outer surface of the mirror housing. The signal lamp includes a reflection unit, a lens unit including a half mirror formed on at least a portion of a surface of the lens unit, and a light source unit disposed between the reflection unit and the lens unit and including a light guide and a light source supported on the light guide. At least a portion of light generated by the light source is transmitted to the half mirror. At least a portion of the light transmitted to the half mirror passes through the lens unit to form a first image and at least another portion of the light transmitted to the half mirror is reflected from the half mirror and transmitted to the reflection unit. At least a portion of the light transmitted to the reflection unit is reflected from the reflection unit and transmitted to the half mirror. At least a portion of the light transmitted to the half mirror passes through the lens unit to form a second image and at least another portion of the light transmitted to the half mirror is reflected from the half mirror and transmitted to the reflection unit. The brightness of the second image is not greater than that of the first image. As light continues to further travel, the multiple images (third, fourth, fifth images and so on) may be generated by the lamp.

Lamps according to the present invention provide various advantages. For example, it is possible to improve design aspects of the exterior of a vehicle. Also, it is possible to improve visibility of a repetition image by varying the location of a light source unit of a signal lamp depending on the location of installation of the signal lamp. In addition, it is possible to render a variety of images of repetition by adjusting the distance between a light source unit of the signal lamp and a reflection unit and a half mirror that are on either side of the light source unit. Further, it is possible to render an undistorted repetition image by making either end of the light source unit of the signal lamp lie on a normal line to an inside surface of a lens unit.

Lamps according to the present invention are not restricted to those set forth herein. Lamps according to the above and other exemplary embodiments of the invention will be or become apparent to one of ordinary skill in the art to which the invention pertains upon review of the following drawings and detailed description below. It is intended that all such additional lamps be included within this description, be within the scope of the present invention, and be protected by the accompanying claims.

DETAILED DESCRIPTION OF THE EMBODIMENTS

Figure 1:
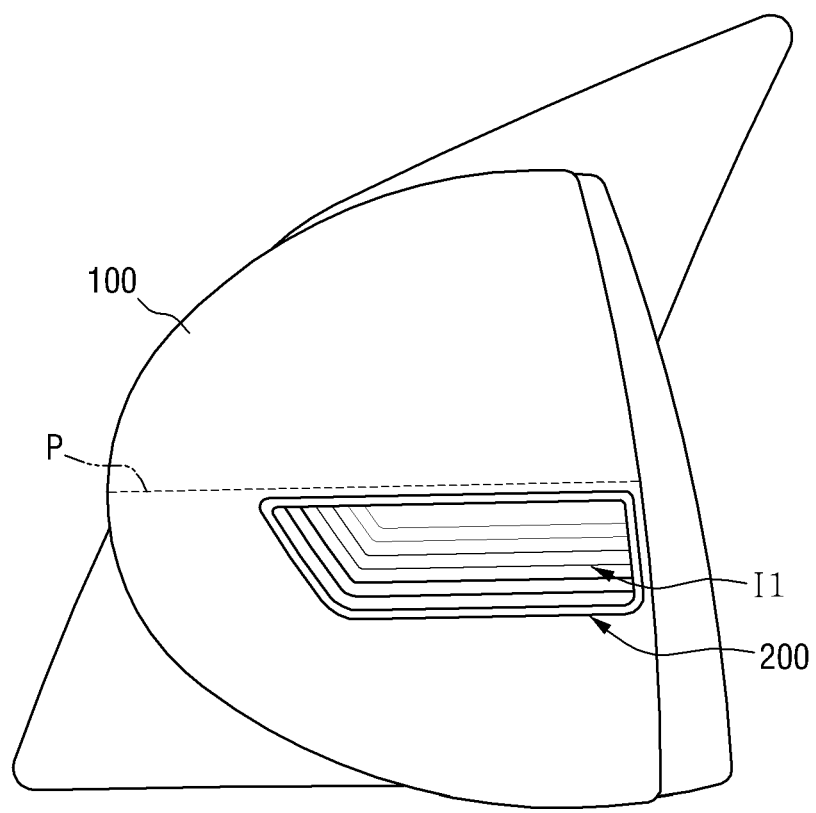
FIGS. 1 to 3 are schematic views illustrating signal lamps according to exemplary embodiments of the invention.

Advantages and features of the invention and methods of accomplishing the same may be understood more readily by reference to the following detailed description of exemplary embodiments and the accompanying drawings. The invention may, however, be embodied in many different provides and should not be construed as being limited to the embodiments set forth herein. Rather, these embodiments are provided so that this disclosure will be thorough and complete and will fully convey the concept of the invention to those skilled in the art, and the invention will only be defined by the appended claims. Like reference numerals refer to like elements throughout the specification.

As used herein, the singular forms "a," "an" and "the" are intended to include the plural forms as well, unless the context clearly indicates otherwise. It will be further understood that the terms "comprises (includes)" and/or "comprising (including)," when used in this specification, specify the presence of stated features, integers, steps, operations, elements, and/or components, but do not preclude the presence or addition of one or more other features, integers, steps, operations, elements, components, and/or groups thereof.

Additionally, exemplary embodiments in the description that follows will be described with reference to sectional views and/or plan views as ideal exemplary views of the invention. In the drawings, the dimensions of layers and regions are exaggerated for clarity of illustration. Accordingly, shapes illustrated in the exemplary views may be modified according to manufacturing techniques and/or allowable errors. Therefore, exemplary embodiments of the invention are not limited to the shapes illustrated in the exemplary views, but may include other shapes that may be created according to manufacturing processes.

Exemplary embodiments will hereinafter be described with reference to the accompanying drawings.

Figure 2:
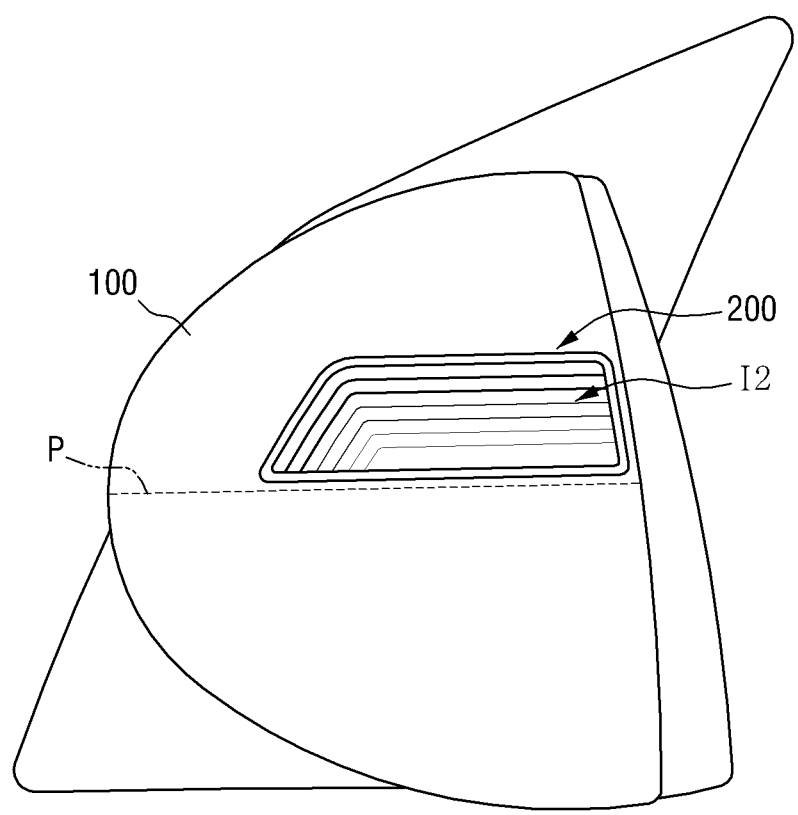
Figure 3:
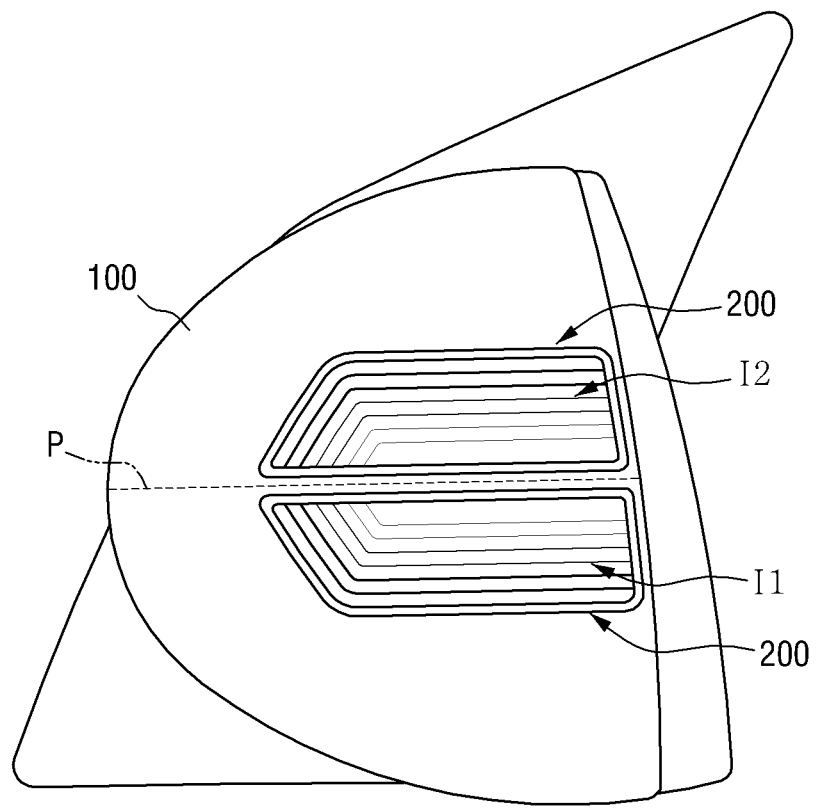

FIGS. 1 to 3 are schematic views illustrating lamps for a vehicle, according to exemplary embodiments of the invention.

Referring to FIGS. 1 to 3, a lamp 1 for a vehicle may include a mirror housing 100, which has a mirror (not illustrated) installed therein at the rear thereof, and a signal lamp 200, which is provided on an outer surface of the mirror housing 100. The signal lamp 200 may be formed at the front or on the side of the mirror housing 100. If desired, the signal lamp 200 may be formed to extend from the front to the side of the mirror housing 100.

In the description that follows, it is assumed that the signal lamp 200 is installed at an outside mirror of a vehicle and is used as a turn signal lamp or a position lamp, but the invention is not limited thereto. That is, the signal lamp 200 may also be used for various other purposes than those set forth herein, such as signaling nearby vehicles or pedestrians as to the state of driving of the vehicle.

The signal lamp 200 may form a light pattern having a plurality of images I1 or I2. For example, as illustrated in FIGS. 1 and 2, the signal lamp 200 may form a light pattern having multiple, repeated line-shaped images I1 or I2. The multiple, repeated images may have different brightnesses. In some embodiments, the brightness of the multiple images may gradually increase or decrease. FIG. 1 shows an example in which brightness of multiple, repeated images gradually decrease as they go from the bottom to the top and FIG. 2 shows an example in which brightness of multiple, repeated images gradually increase as they go from the bottom to the top.

The signal lamp 200 may be installed at different locations. The signal lamp 200 may be installed on a portion of an upper outer surface of the mirror housing 100, on a portion of a lower outer surface of the mirror housing 100, or on both. In some embodiments, the signal lamp 200 may be installed at a lower side of a curved portion P of the mirror housing 100, as illustrated in FIG. 1 or at an upper side of the curved portion P of the mirror housing 100, as illustrated in FIG. 2. The curved portion P may be a portion of the mirror housing 100 where a direction of the inflexion of the mirror housing 100 changes, and may appear in the shape of a line connecting a plurality of points of inflection where the direction of the inflexion of the mirror housing 100 changes. The curved portion P may have one of the shapes of a dot, a line and a surface depending on the shape of the mirror housing 100. However, the invention is not limited thereto.

Also, the light sources may be installed at different locations. In a case when the signal lamp 200 is installed at an outside mirror of a vehicle, a nearby driver or pedestrian's point of view may be located above the signal lamp 200. In this case, if the location of light source(s) of the signal lamp 200 for forming the repetition images I1 and I2 is fixed, one of the repetition images I1 and I2 may not be able to be properly seen. For example, in a case when the signal lamp 200 is located at the lower side of the curved portion P of the mirror housing 100, as illustrated in FIG. 1, the repetition image I1 may be more likely to be properly seen when the light source unit is located at a lower side of the signal lamp 200 than when the light source unit is located at an upper side of the signal lamp 200. On the other hand, in a case when the signal lamp 200 is located at the upper side of the curved portion P of the mirror housing 100, as illustrated in FIG. 2, the repetition image I2 may be more likely to be properly seen when the light source unit is located at the upper side of the signal lamp 200 than when the light source unit is located at the lower side of the signal lamp 200. The expression "the repetition image I1 or I2 being properly seen", as used herein, may mean that the repetition image I1 or I2 is highly visible with a relatively large number of repetitions of a pattern thereof visible to a nearby driver or pedestrian.

Figure 4:
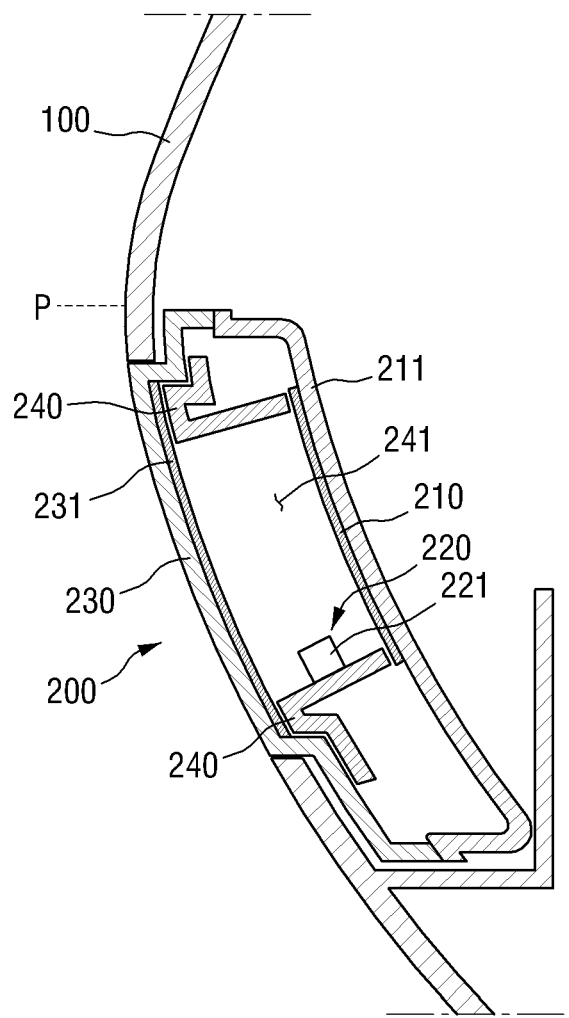
FIGS. 4 and 5 are cross-sectional views illustrating the signal lamps according to exemplary embodiments of the invention.
Figure 5:
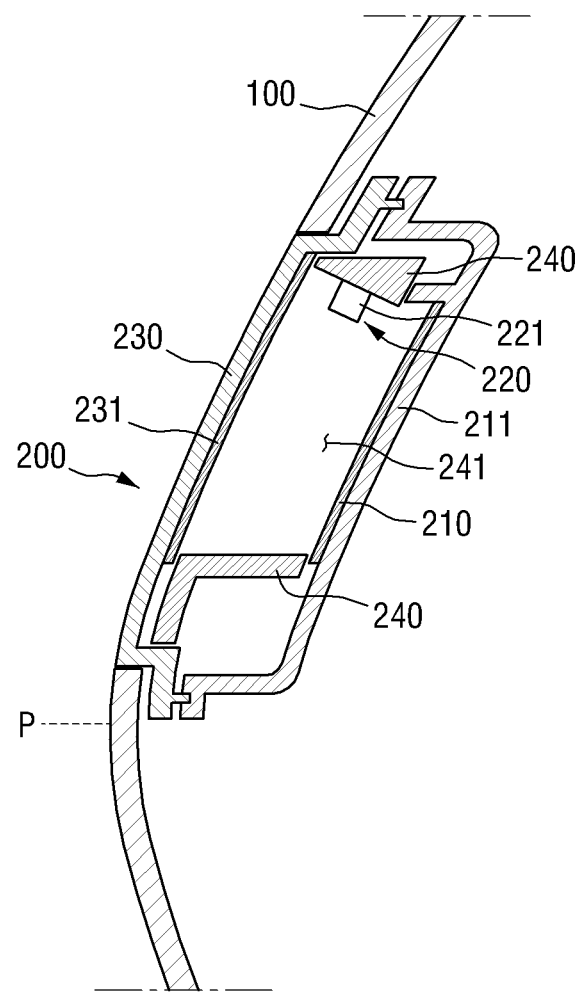

The signal lamp 200 will hereinafter be described in greater detail. FIGS. 4 and 5 are cross-sectional views illustrating lamps for a vehicle, according to exemplary embodiments of the invention. More specifically, FIG. 4 illustrates a cross-sectional view of the lamp 1 of FIG. 1, and FIG. 5 illustrates a cross-sectional view of the lamp 1 of FIG. 2.

Referring to FIG. 4, the signal lamp 200 may be installed at the lower side of the curved portion P of the mirror housing 100. The signal lamp 200 may include a reflection unit 210, a light source unit 220, a lens unit 230, and a support unit 240.

The reflection unit 210 is formed on a surface of a lamp housing 211 facing the lens unit 230 so as to reflect light toward the lens unit 230. In an embodiment, the reflection unit 210 may be provided as a metal coating layer (such as a chrome coating layer) which has a high reflectivity and. In another embodiment, the reflection unit 210 may be provided as a separate element from the lamp housing 211. In this case, the reflection unit 210 may be disposed at one side of the lamp housing 211 and may be hook- or screw-coupled to the lamp housing 211 or bonded to the lamp housing 211 by an adhesive. In a further embodiment, the reflection unit 210 may be coupled to another element capable of supporting the reflection unit 210, and may then be disposed at one side of the lamp housing 211.

The light source unit 220 may include a light guide 221 one or more light sources 222a and 222b supported by the light guide. In an embodiment, the light sources 222a and 222b may be disposed on at least one end of the light guide 221.

The light guide 221 may be of a linear type, and may be formed to be partially bent with a predetermined angle. The shape of the light guide 221 may vary depending on the layout of the signal lamp 200 or the pattern of the repetition image I1 or I2.

Figure 6:
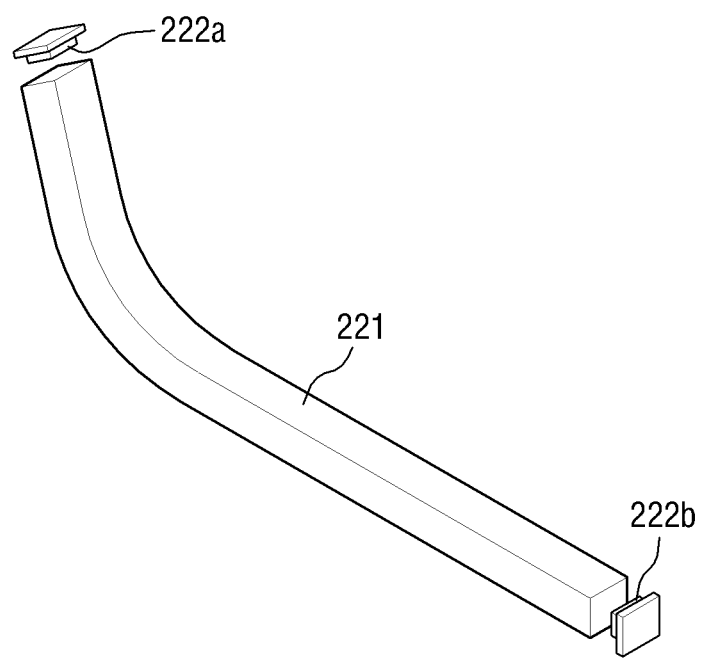
FIG. 6 is a schematic view illustrating a light source unit of a signal lamp according to an exemplary embodiment of the invention, which is installed at a lower side of a curved portion of a mirror housing.

The light sources 222a and 222b may be implemented as light-emitting diode (LED) units. The light sources 222a and 222b may be disposed at both ends of the light guide 221, as illustrated in FIG. 6. However, the invention is not limited to this. That is, the number and location of the light sources 222a and 222b may be varied.

The lens unit 230 may be disposed at the front of the reflection unit 210, and may include a half mirror 231 which is formed on at least a portion of a surface of the lens unit 230. In the description that follows, it is assumed that the half mirror 231 is formed on an inner surface of the lens unit 230, but the invention is not limited thereto. For example, the half mirror may be formed on an outer surface of the lens unit 230.

The half mirror 231 reflects at least a portion of light incident upon the lens unit 230 and allows at least another portion of the incident light to transmit through the lens unit 230. The half mirror 231 may be coated with a metal coating layer such as a chrome coating layer, an aluminum coating layer or a metal oxide coating layer, and the metal coating layer may be formed by spin coating, spray coating, sputtering deposition, vacuum deposition, or plasma deposition. The half mirror 231 may be formed as a film that can be attached onto the lens unit 230, instead of being formed as a metal coating layer.

During daytime driving, in a case in which the light source unit 220 is off, the inside of the signal lamp 220 can hardly be seen through the lens unit 230 by a naked eye. On the other hand, during night-time driving, the light source unit 220 is turned on, and properly serves as a lamp. Accordingly, it is possible to provide different exterior designs for daytime driving and night-time driving.

Figure 7:
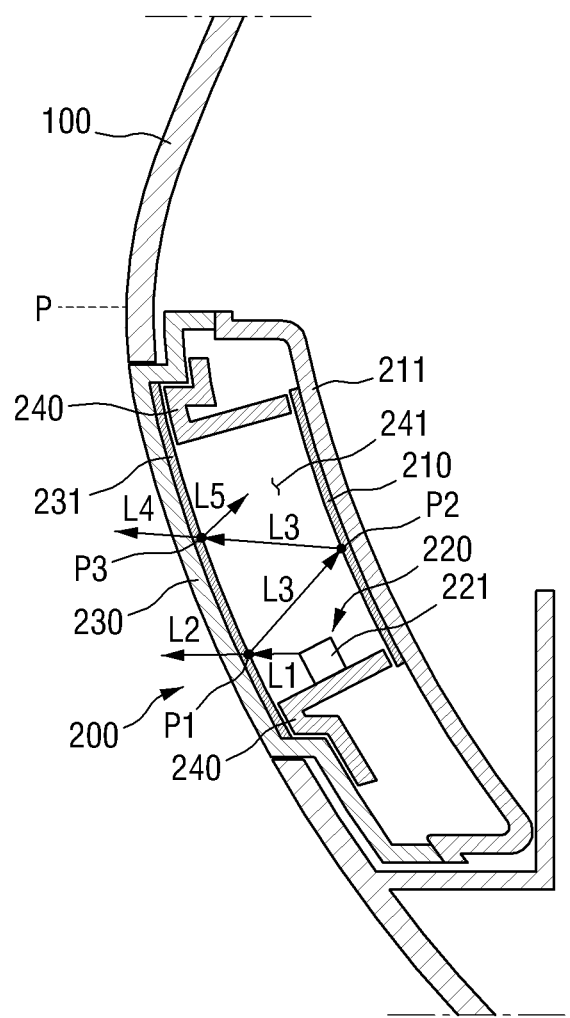
FIG. 7 is a schematic view illustrating the path of light in the signal lamp installed at the lower side of the curved portion of the mirror housing.

The reflection unit 210 and the half mirror 231 may continue to reflect light generated by the light source unit 220 therebetween so as to generate the repetition image I1 of FIG. 1. For example, as shown in FIG. 7, in response to light L1 generated by the light guide 221 (light source) being incident upon a first location P1 on the half mirror 231, at least a portion of the incident light L1, i.e., light L2, transmits through the half mirror 231, and light L3 is reflected to the reflection unit 210. The light L3 is reflected from a second location P2 on the reflection unit 210 back to the half mirror 231, and is incident upon a third location P3 on the half mirror 231. At least a portion of the light incident upon the third location P3, i.e., light L4, transmits through the half mirror 231, and light L5 is reflected to the reflection unit 210.

An image formed by the light L2, which transmits through the half mirror 231 at the first location P1, may be an original image formed by the light source unit 220, and an image formed by the light L4, which transmits through the half mirror 231 at the third location P3, may be a reflection of the original image. Accordingly, it may be understood that the repetition image I1 of FIG. 1 includes a single original image and a plurality of reflections of the single original image.

Due to light reflected back and forth between the reflection unit 210 and the half mirror 231, the repetition image I1 of FIG. 1 may be formed. Since the amount of light L4 transmitted through the third location P3 is not greater than the amount of light L1 transmitted through the first location P1, an image with brightness may gradually decrease from the bottom to the top thereof may be formed.

The support unit 240 may include an opening 241 with a predetermined size and may be disposed between the reflection unit 210 and the lens unit 230 to support the light source unit 220. For example, the light guide 221 of the light source unit 220 may be disposed on at least part of the circumference of the opening 241.

The exemplary embodiment of FIG. 4 has been described, taking as an example a case when the light source unit 220 is located at the lower side of the signal lamp 200. In the exemplary embodiment of FIG. 4, the light guide 221 of the light source unit 220 may be located at a lower side of the circumference of the opening 241.

Referring to FIG. 5, the signal lamp 200 may be installed at the upper side of the curved portion P of the mirror housing 100. The signal lamp 200, like its counterpart of FIG. 4, may include a reflection unit 210, a light source unit 220, a lens unit 230 and a support unit 240. The reflection unit 210, the light source unit 220, the lens unit 230 and the support unit 240 are similar to their respective counterparts of FIG. 4, and thus, detailed descriptions thereof will be omitted.

Figure 8:
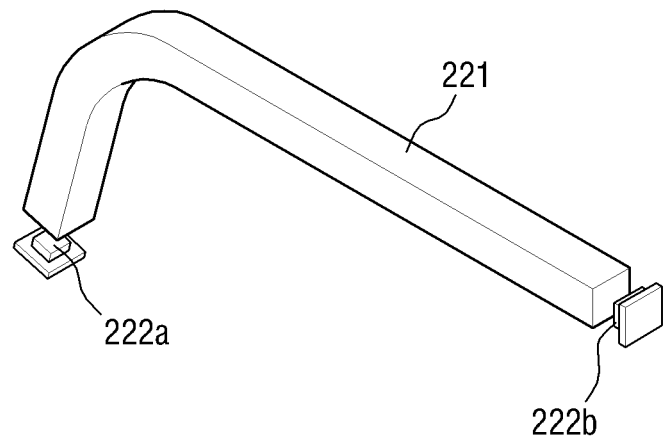
FIG. 8 is a schematic view illustrating a light source unit of a signal lamp according to another exemplary embodiment of the invention, which is installed at an upper side of the curved portion of the mirror housing.

Referring to FIG. 8, the light source unit 220 of FIG. 5, like its counterpart of FIG. 6, may include a light guide 221 and light sources 222a and 222b. The light source unit 220 of FIG. 8 may differ from the light source unit 220 of FIG. 6 in terms of the shape of the light guide 221 or the location of the light sources 222a and 222b, and it may be understood that such differences between the light source unit 220 of FIG. 8 differs from the light source unit 220 of FIG. 6 result from different layouts for the signal lamp 200.

The exemplary embodiment of FIG. 5 has been described, taking as an example a case when the light source unit 220 is disposed at the upper side of the signal lamp 200. In the exemplary embodiment of FIG. 5, the light guide 221 of the light source unit 220 may be disposed at an upper side of the circumference of the opening 241.

Figure 9:
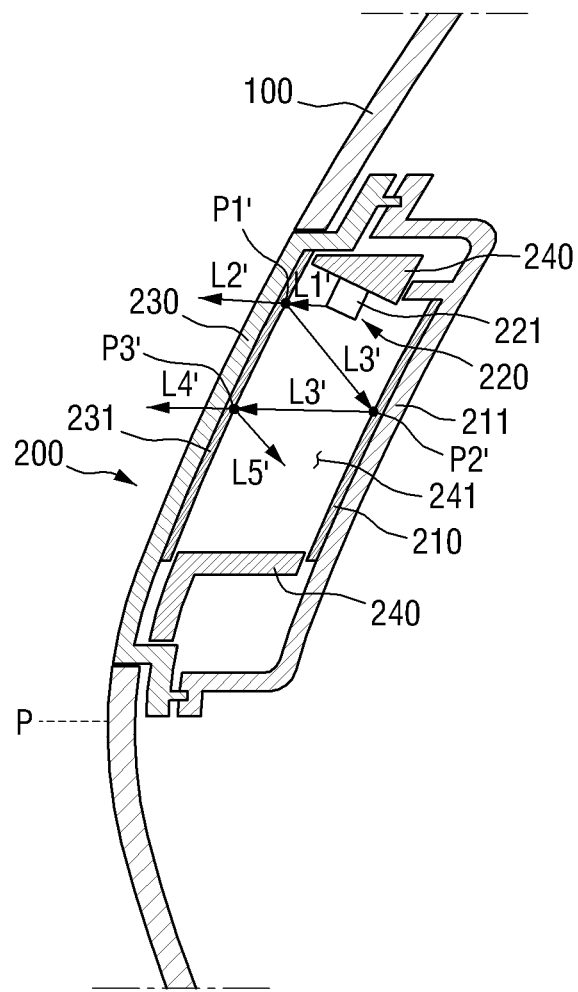
FIG. 9 is a schematic view illustrating the path of light in the signal lamp installed at the upper side of the curved portion of the mirror housing.

Referring to FIG. 9, the signal lamp 200 of FIG. 5, which differs from its counterpart of FIG. 4 only in the location of the light source unit 220, may form the repetition image I2 of FIG. 2 by transmitting light therethrough or reflecting light back and forth between the reflection unit 210 and the half mirror 231 in a similar manner to that illustrated in FIG. 7. The amount of light L4' transmitted through a third location P3' may be smaller than the amount of light L2' transmitted through a first location P1', and as a result, images with brightness gradually decreasing from the top to the bottom thereof may be formed as light travels further.

An image formed by the light L2', which transmits through the half mirror 231 at the first location P1', may be an original image formed by the light source unit 220, and an image formed by the light L4', which transmits through the half mirror 231 at the third location P3', may be a reflection of the original image. Accordingly, it may be understood that the repetition image I2 of FIG. 2 includes a single original image and a plurality of reflections of the single original image.

In a case when the light guide 221 is located at the lower or upper side of the circumference of the opening 241, as illustrated in FIG. 4 or 5, the light guide 221 may be configured to have both ends that lie on a pair of parallel normal lines, respectively, to the inside surface of the lens unit 230, i.e., the inside surface of the half mirror 231, in a cross-sectional view of the light guide 221 to uniformly form the repetition image I1 or I2 without distorting the shape of the repetition image I1 or I2. The both ends of the light guide 221 may be dot-, line- or surface-shaped, in a cross-sectional view of the light guide 221, depending on the shape of the light guide 221.

Figure 10:
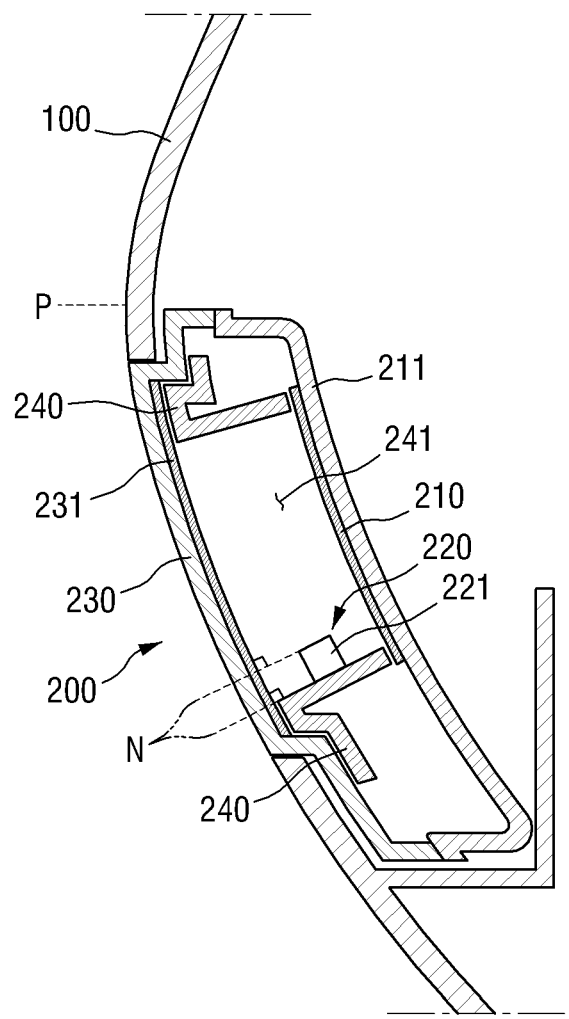
FIGS. 10 to 12 are cross-sectional views illustrating light guides with either end thereof disposed on a normal line to an inside surface of a lens unit, according to exemplary embodiments of the invention.
Figure 11:
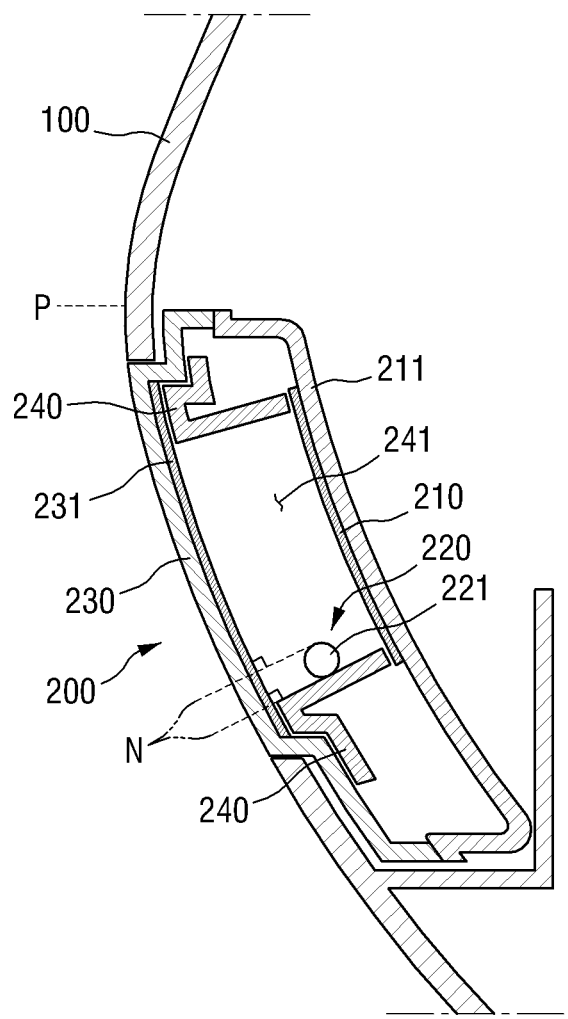
Figure 12:
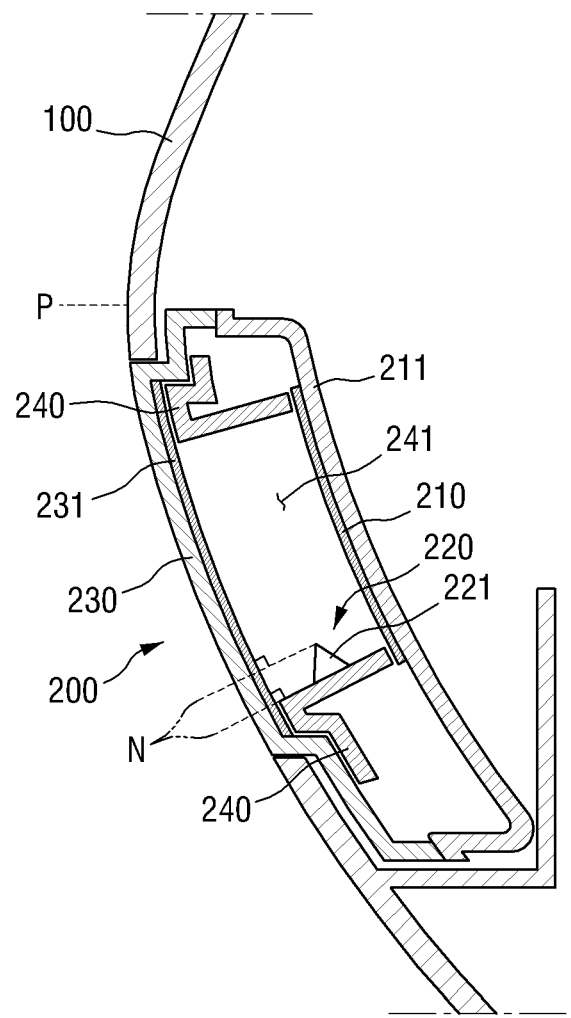

For example, in a case when the light guide 221 is located at a lower side of the opening 241 and has a rectangular or trapezoidal cross-sectional shape, as illustrated in FIG. 4, the top and bottom surfaces of the light guide 221 may lie on a pair of normal lines N, respectively, as illustrated in FIG. 10. Alternatively, in a case when the light guide 221 has a circular cross-sectional shape, the points at the top and the bottom, respectively, of the light guide 221 may lie on a pair of normal lines N, respectively, as illustrated in FIG. 10. Alternatively, in a case when the light guide 221 has a triangular cross-sectional shape, the upper edge and the bottom surface of the light guide 221 may lie on a pair of normal lines N, respectively, as illustrated in FIG. 12.

In the above description of the light guide 221, it is assumed that the light guide 221 is located at the lower side of the opening 241 with either end thereof lying on a normal line to the inside surface of the lens unit 230, but the invention is not limited thereto. That is, the above description of the light guide 221 is directly applicable to a case when the light guide 221 is located at the upper side of the circumference of the opening 241, as illustrated in FIG. 5.

The distance between the pattern repetitions of the repetition image I1 or I2 may be varied depending on a distance d1 between the reflection unit 210 and the light guide 231 and a distance d2 between the light guide 231 and the half mirror 221.

Figure 13:
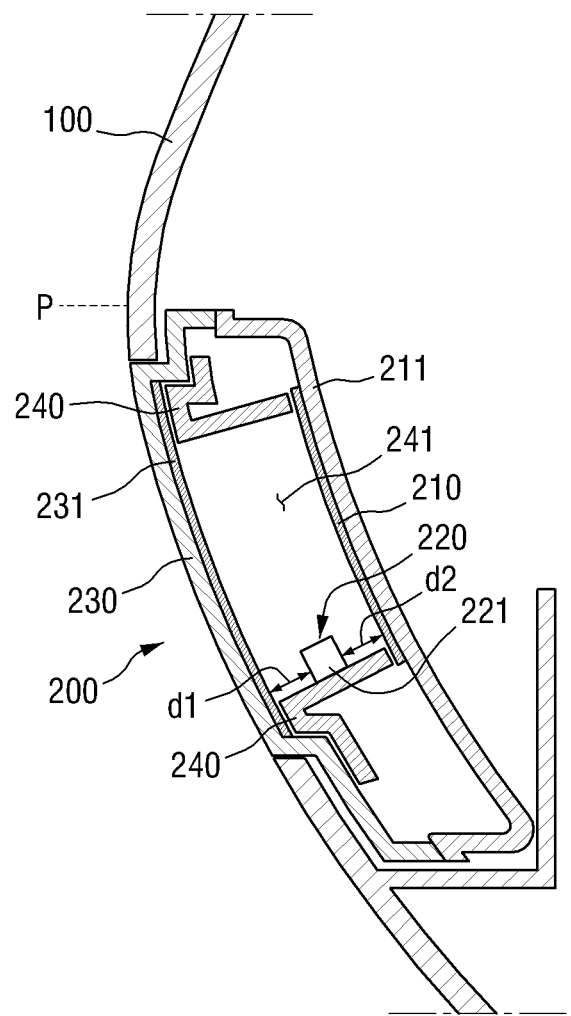
FIGS. 13 to 16 are cross-sectional views illustrating light guides according to exemplary embodiments of the invention, which are each disposed between a reflection unit and a lens unit.

For example, in a case when in the signal lamp 200 of FIG. 4, the distances d1 and d2 are identical, as illustrated in FIG. 13, the distance between the pattern repetitions of the repetition image I1 may be uniform throughout the repetition image I1. Alternatively, in a case when d1>d2 or d2>d1, as illustrated in FIG. 14 or 15, the distance between the pattern repetitions of the repetition image I1 may alternately increase or decrease.

Figure 14:
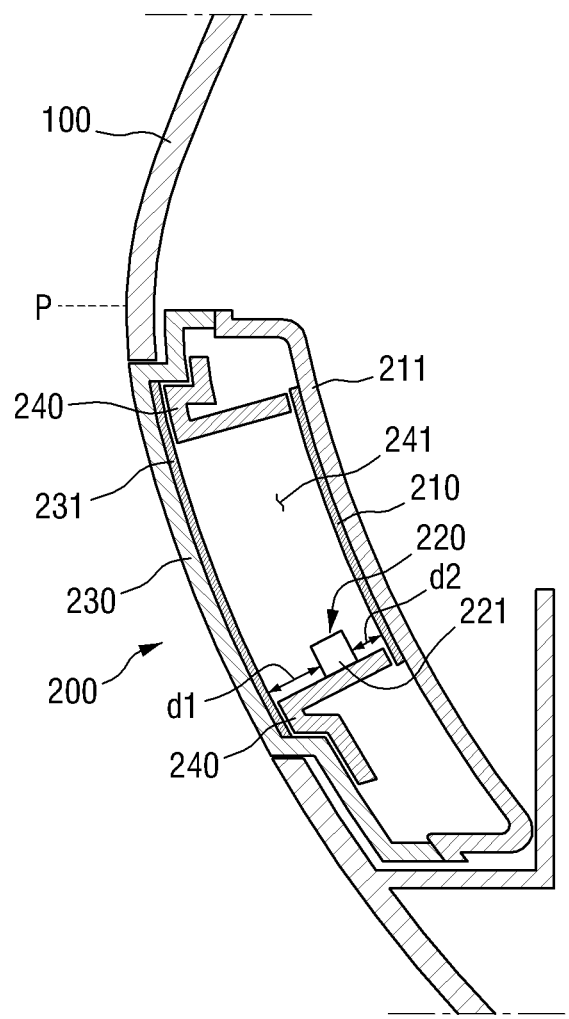
Figure 15:
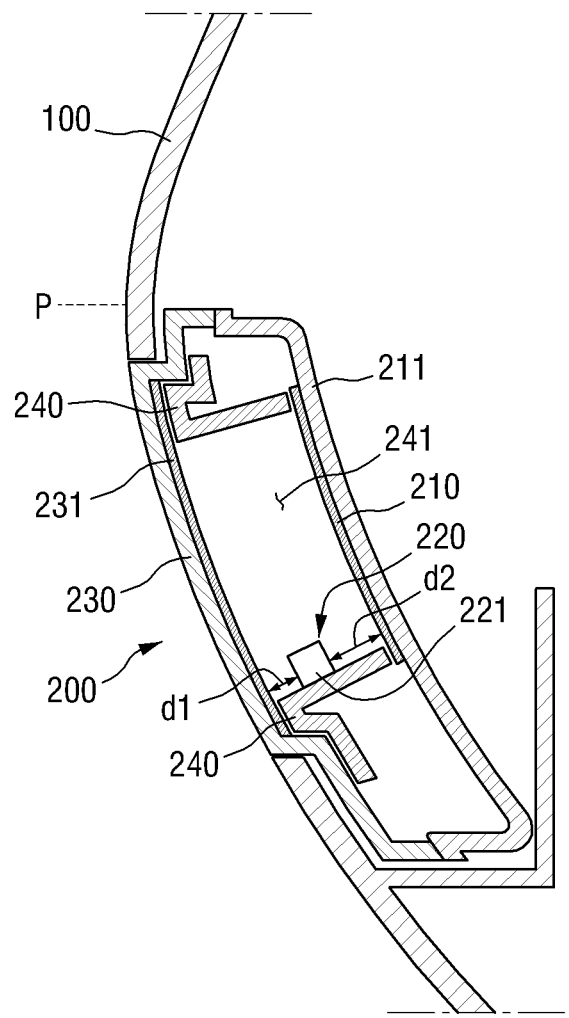

The exemplary embodiments of FIGS. 13 to 15 have been described, taking the signal lamp 200 of FIG. 4 as an example, but are also applicable to the signal lamp 200 of FIG. 5.

Accordingly, a variety of images can be formed by appropriately adjusting the distances d1 and d2.

Figure 16:
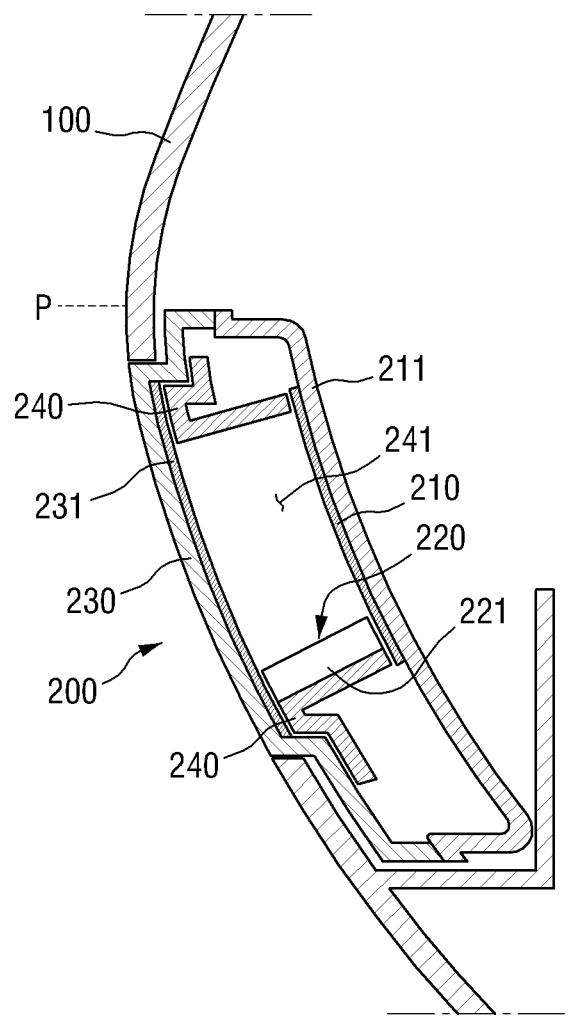

The exemplary embodiments of FIGS. 13 to 15 have been described, taking as an example a case when the thickness of the light guide 221 is smaller than the distance between the reflection unit 210 and the half mirror 231 and the repetition image I1 or I2 is modified by adjusting the distances d1 and d2, but the invention is not limited thereto. That is, the light guide 221 may be formed to be as thick as the distance between the reflection unit 210 and the half mirror 231, as illustrated in FIG. 16.

In a case when the light guide 221 is formed to be as thick as the distance between the reflection unit 210 and the half mirror 231, the repetition image I1 or I2 may be formed to have one or more repetitions of a predetermined pattern that are connected to one another with no gaps thereamong and have different brightnesses from one another.

Figure 17:
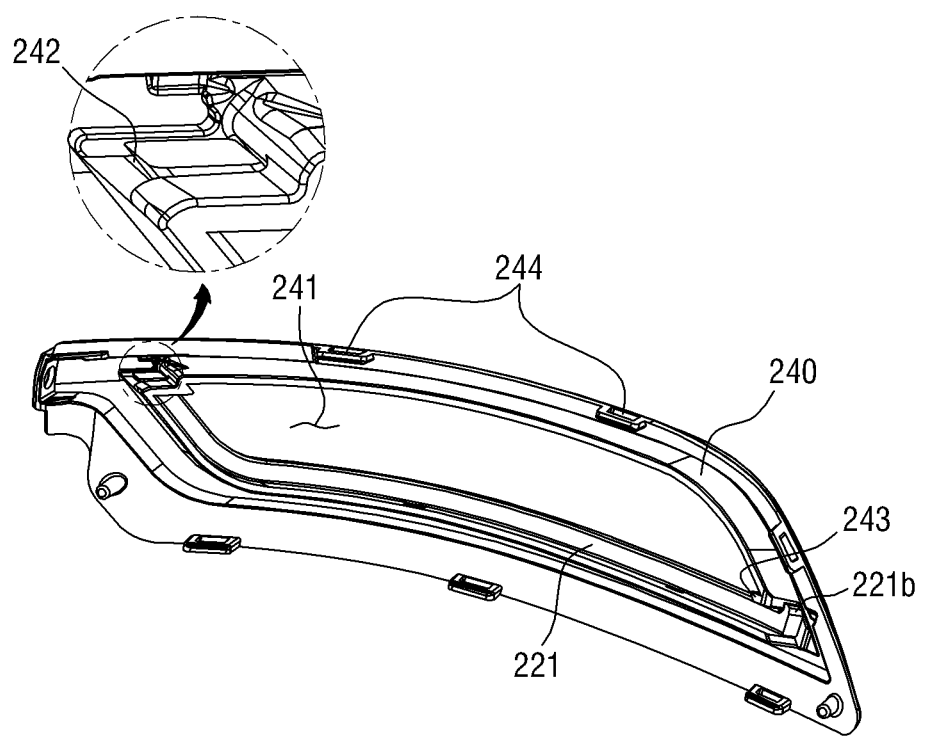
FIG. 17 is an exemplary view illustrating a light guide and a support unit according to an exemplary embodiment of the present invention.
Figure 18:
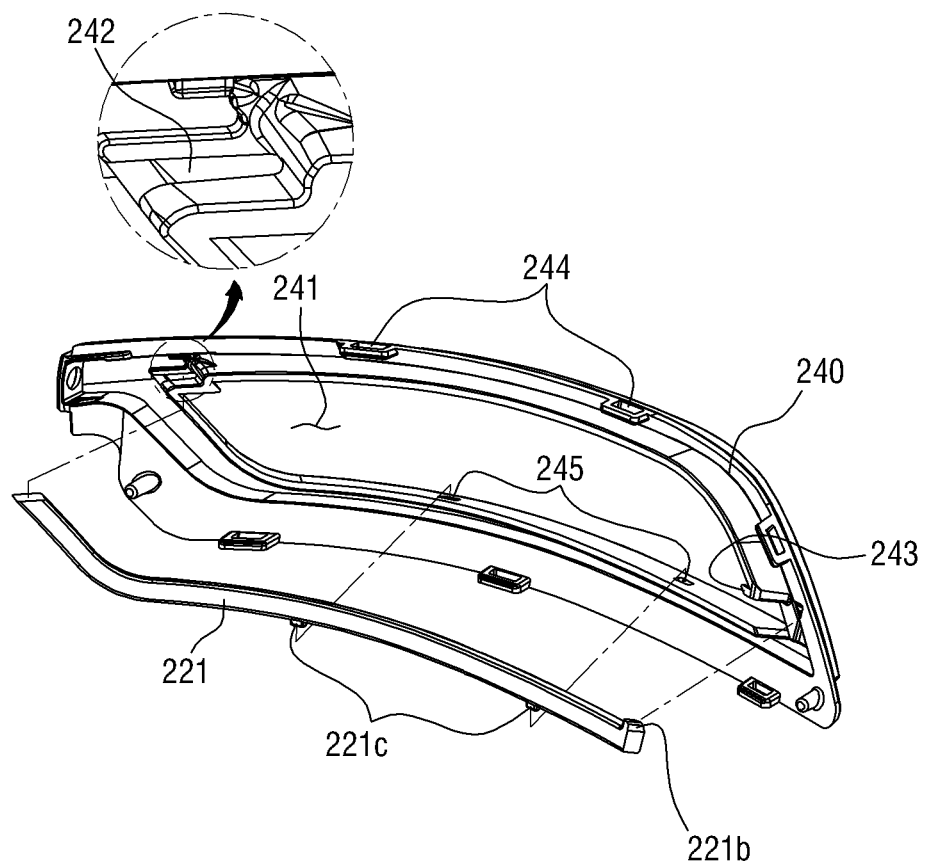
FIG. 18 is an exemplary detailed view illustrating the light guide and the support unit according to an exemplary embodiment of the present invention.

Referring to FIGS. 17 and 18, the support unit 240 may include an insertion bore 242 into which one end of the light guide 221 may be inserted and a recess 243 which may be hook coupled to and thus engage with, a protrusion 221b formed on the other end of the light guide 221. One or more coupling grooves 244 may be formed at the outer circumferential end of the support unit 240. The coupling grooves 244 may be hook coupled to, and thus engage with, protrusions 213 formed on the lamp housing 211. For example, the support unit 240 may be hook coupled to the lamp housing 211. Alternatively, the support unit 240 may be screw coupled or slidably coupled to the lamp housing 211, or may be bonded to the lamp housing 211 by an adhesive. Further, the support unit 240 may be coupled to the lens unit 230, rather than to the lamp housing 211.

Fixing grooves 245 into which fixing protrusions 221c formed on the light guide 221 may respectively inserted may be formed on the first side of the outer circumferential end of the opening 241 of the support unit 240 where the light guide 221 may be located. Due to the presence of the insertion bore 242, the recess 243, and the fixing grooves 245, the support unit 240 may align the light guide 221 therein. Accordingly, in response to the light guide 221 being coupled to the support unit 240 and the support unit 240 being coupled to the lamp housing 211, the light sources 222a and 222b may be disposed at either end of the light guide 221.

In a non-limiting example, the light guide 221 may be coupled to the support unit 240, and the light sources 222a and 222b may be installed within the lamp housing 211. Alternatively, the light guide 221 and the light sources 222a and 222b may all be installed within the support unit 240. The support unit 240 may be optional when another structure or element used to align the first light source unit 220 is provided (particularly, the light guide 221). In another non-limiting example, one first light source unit 220 may be disposed on the first side of the outer circumferential end of the opening 241 of the support unit 240. Alternatively, a plurality of first light source units 220 may be provided.

As described above, in the lamp 1, the location of the light source unit 220 may be varied depending on the location of installation of the signal lamp 200 relative to the curved portion P of the mirror housing 100. Accordingly, the visibility of the repetition image I1 or I2 can be improved such that the repetition image I1 or I2 can be properly seen by a nearby driver or pedestrian.

While the invention has been particularly shown and described with reference to exemplary embodiments thereof, it will be understood by those of ordinary skill in the art that various changes in provide and detail may be made therein without departing from the spirit and scope of the invention as defined by the following claims. The exemplary embodiments should be considered in a descriptive sense only and not for purposes of limitation.

What is claimed is:

1. A lamp for a vehicle, comprising:
a mirror housing accommodating a mirror therein; and
a signal lamp installed on a portion of an outer surface of the mirror housing and configured to form a repetition image having a predetermined pattern,
wherein the signal lamp includes:
a reflection unit including a metal coating layer formed on one surface thereof;
a lens unit disposed at the front of the reflection unit and including a half mirror formed on at least a portion of a surface the lens unit; and
a light source unit disposed between the reflection unit and the lens unit and including one or more light sources and a light guide disposed between the metal coating layer and the half mirror,
wherein the repetition image includes an original image of the light guide and one or more reflections of the original image,
wherein the mirror housing has a curved portion that appears in a shape of a line connecting a plurality of points of inflection, and
wherein a location of the light guide of the light source unit is decided depending on whether the signal lamp is located below or above the curved portion of the mirror housing.

2. The lamp of claim 1, wherein the signal lamp is installed on a portion of an upper outer surface of the mirror housing, on a portion of a lower outer surface of the mirror housing, or on both.

3. The lamp of claim 1, wherein if the signal lamp is installed below the curved portion of the mirror housing, the light guide of the light source unit is located at a lower side of the signal lamp.

4. The lamp of claim 1, wherein if the signal lamp is installed above the curved portion of the mirror housing, the light guide of the light source unit is located at an upper side of the signal lamp.

5. The lamp of claim 1, wherein upper and lower ends of the light guide lie on a pair of parallel normal lines to an inside surface of the lens unit.

6. The lamp of claim 1, wherein the light guide has a thickness smaller or the same as a distance between the reflection unit and the lens unit.

7. The lamp of claim 1, wherein a distance between images included in the repetition image is decided depending on a distance between the light guide and the reflection unit and a distance between the light guide and the lens unit.

8. The lamp of claim 1, further comprising:
a support unit including an opening with a predetermined size and configured to be disposed between the reflection unit and the lens unit,
wherein the light source unit is disposed on one side of the circumference of the opening.

9. The lamp of claim 8, wherein the light source unit is disposed at at least one of lower and upper sides of the circumference of the opening depending on the location of installation of the signal lamp relative to the curved portion of the mirror housing.

10. A lamp for a vehicle, comprising:
a mirror housing accommodating a mirror therein; and
a signal lamp installed on a portion of an outer surface of the mirror housing and configured to form a repetition image having a predetermined pattern,
wherein the signal lamp includes:
a reflection unit including a metal coating layer formed on one surface thereof;
a lens unit disposed at the front of the reflection unit and including a half mirror formed on at least a portion of a surface the lens unit; and
a light source unit disposed between the reflection unit and the lens unit and including one or more light sources and a light guide disposed between the metal coating layer and the half mirror, and
a support unit including an opening with a predetermined size and configured to be disposed between the reflection unit and the lens unit, wherein the light source unit is disposed on one side of the circumference of the opening
wherein the repetition image includes an original image of the light guide and one or more reflections of the original image.

11. The lamp of claim 10, wherein the signal lamp is installed on a portion of an upper outer surface of the mirror housing, on a portion of a lower outer surface of the mirror housing, or on both.

12. The lamp of claim 10, wherein the mirror housing has a curved portion that appears in a shape of a line connecting a plurality of points of inflection and wherein if the signal lamp is installed below the curved portion of the mirror housing, the light guide of the light source unit is located at a lower side of the signal lamp.

13. The lamp of claim 10, wherein the mirror housing has a curved portion that appears in a shape of a line connecting a plurality of points of inflection and wherein if the signal lamp is installed above the curved portion of the mirror housing, the light guide of the light source unit is located at an upper side of the signal lamp.

14. The lamp of claim 10, wherein upper and lower ends of the light guide lie on a pair of parallel normal lines to an inside surface of the lens unit.

15. The lamp of claim 10, wherein the light guide has a thickness smaller or the same as a distance between the reflection unit and the lens unit.

16. The lamp of claim 10, wherein a distance between images included in the repetition image is decided depending on a distance between the light guide and the reflection unit and a distance between the light guide and the lens unit.

* * * * *